No. 796,972. PATENTED AUG. 8, 1905.
E. B. HUNTER.
RAIL BOND.
APPLICATION FILED DEC. 15, 1903.
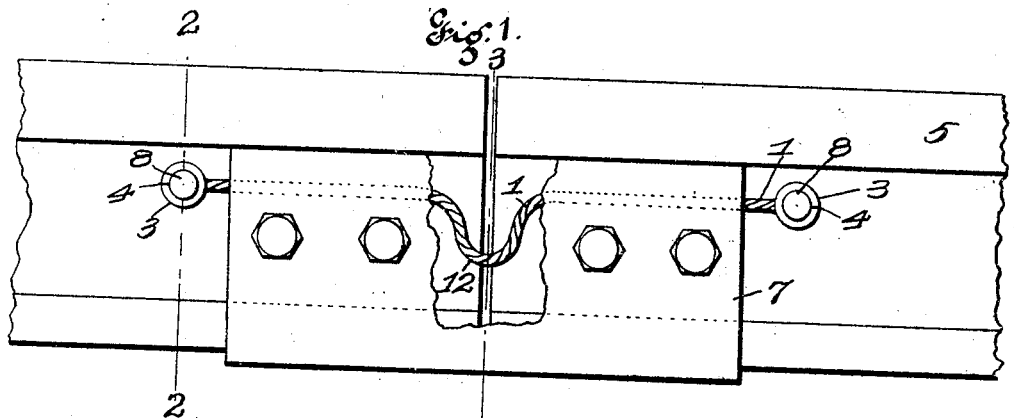
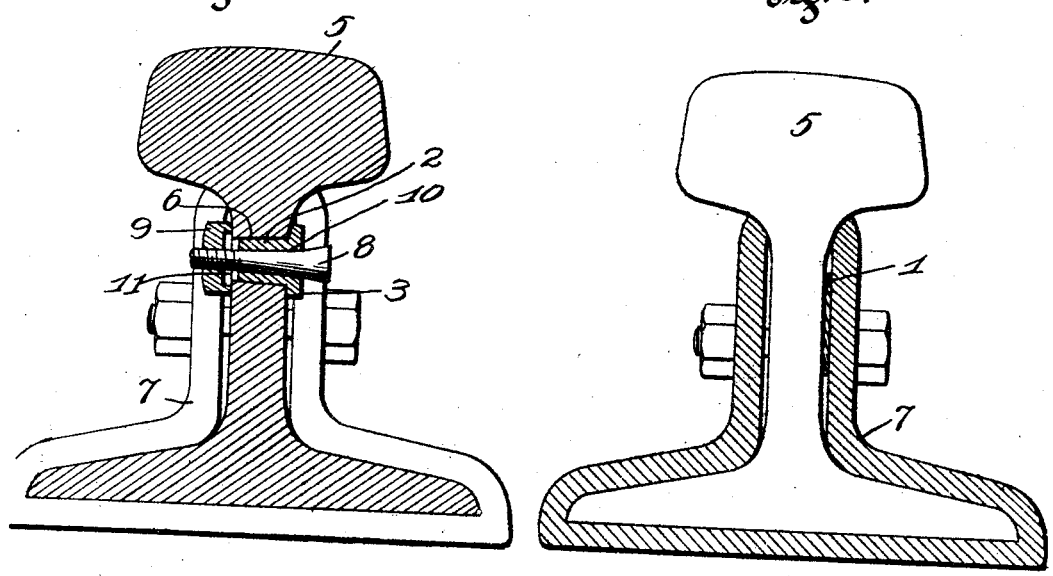
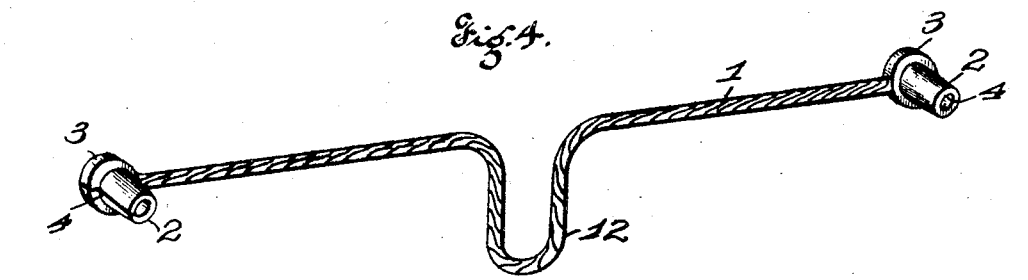
Witnesses
Alfred A. Eicks
M. S. Snow
Inventor
Edward B. Hunter
by Higdon & Longan & Hopkins attys

UNITED STATES PATENT OFFICE.

EDWARD B. HUNTER, OF FRENCH VILLAGE, ILLINOIS, ASSIGNOR OF ONE-FOURTH TO FRANK SIMONIN, OF FRENCH VILLAGE, ILLINOIS.

RAIL-BOND.

No. 796,972.      Specification of Letters Patent.      Patented Aug. 8, 1905.

Application filed December 15, 1903. Serial No. 185,322.

*To all whom it may concern:*

Be it known that I, EDWARD B. HUNTER, a citizen of the United States, residing at French Village, St. Clair county, State of Illinois, have invented certain new and useful Improvements in Rail-Bonds, of which the following is a specification containing a full, clear, and exact description, reference being had to the accompanying drawings, forming a part hereof.

My invention relates to improvements in rail-bonds; and it consists of the novel construction, combination, and arrangement of parts hereinafter shown, described, and claimed.

The object of my invention is to provide an improved rail-bond which shall be simple and inexpensive in construction and which shall make a very lasting and effective contact between the rail and the bond.

In the drawings, Figure 1 is a side elevation of the ends of two electric-railway rails connected by my improved bond. Fig. 2 is an enlarged section on the line 2 2 of Fig. 1. Fig. 3 is an enlarged section on the line 3 3 of Fig. 1. Fig. 4 is a perspective view of my improved bond detached.

My improved bond preferably has its body 1 composed of a series of fine copper strands, at both ends of which is a split thimble 2, having a head 3 at one end. The thimbles 2 are preferably provided with a slit 4, by means of which said thimbles are circumferentially divided at a point diametrically opposite the point at which said body 1 is attached; but of course said slit may be located at any other desired point in the circumference of said thimbles.

The device formed in the above-described manner is applied to the rails 5 by inserting the thimbles 2 within suitable tapered holes 6, formed in said rails at a point adjacent the ends of the usual fish-plate or rail-chair 7, the head 3 resting in contact with the rail, as shown in Fig. 2. After said thimbles have been thus inserted they are expanded within said tapered holes by means of tapered bolts 8, which are driven within the said thimbles and secured by means of a nut 9, threaded upon the smaller end of said tapered bolts. It should be stated that the bore 10 of the thimbles is also tapered to fit the taper of the said bolts. The said bolts may be tightened from time to time by driving them farther in and tightening the nuts 9, and such action will force the heads 3 and thimbles 2 into more intimate contact with the rail. The inner face of the nuts is counterbored at 11, which counterbore is of sufficient size to permit the smaller end of the said thimbles to pass within said counterbore when said nut is tightened.

The thimbles 2 are composed of soft copper, which may be readily stretched, and it will thus be understood that the thimbles may be stretched and forced into the tapered holes of the rail and also into the counterbores of the said nuts when occasion requires in order to make a better contact.

The body 1 of the bond extends through the space between the fish-plate or chair 7 and the rails 5 and is made considerably longer than the distance between the rail-holes 6, and the excess of length is permitted to depend in the form of a U-shaped loop 12. The function of the loop 12 is to permit the rails 5 to move away from each other during the expansion thereof.

I do not limit myself to the specific construction herein shown, as it is obvious that the same may be changed by skilled workmanship without departing from the scope of my invention.

I claim—

In a device of the class described, the combination with rails, in the meeting ends of which are formed tapered apertures, of soft-metal tapered split plugs seated in said apertures, and which plugs are provided with tapered bores, the angle of which correspond with the angle of the exterior of said plugs, and also with the angle of the apertures in the rails; heads integral with the larger ends of said plugs; a flexible metal conductor having its ends formed integral with the heads of the plugs; tapered bolts passing through the plugs; and nuts having recessed inner faces seated upon the screw-thread ends of said bolts; substantially as specified.

In testimony whereof I have signed my name to this specification in presence of two subscribing witnesses.

EDWARD B. HUNTER.

Witnesses:
     FRANK SIMONIN,
     I. F. LAROBARDIER.